(12) United States Patent
Upendran (10) Patent No.: US 12,430,351 B2
(45) Date of Patent: Sep. 30, 2025

(54) SYSTEM AND METHOD FOR INGESTING DATA BASED ON PROCESSED METADATA

(71) Applicant: The Toronto-Dominion Bank, Toronto (CA)

(72) Inventor: Rajesh Upendran, Kitchener (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 18/469,906

(22) Filed: Sep. 19, 2023

(65) Prior Publication Data

US 2025/0094437 A1    Mar. 20, 2025

(51) Int. Cl.
*G06F 16/25*  (2019.01)
*G06F 16/28*  (2019.01)

(52) U.S. Cl.
CPC .......... *G06F 16/254* (2019.01); *G06F 16/285* (2019.01)

(58) Field of Classification Search
CPC .................................................... G06F 16/254
See application file for complete search history.

(56) References Cited

U.S. PATENT DOCUMENTS

| | | | |
|---|---|---|---|
| 6,226,618 B1 | 5/2001 | Downs et al. | |
| 6,988,109 B2 | 1/2006 | Stanley et al. | |
| 7,209,571 B2 | 4/2007 | Davis et al. | |
| 7,373,350 B1 | 5/2008 | Arone et al. | |
| 7,689,510 B2 | 3/2010 | Lamkin et al. | |
| 9,275,157 B2 | 3/2016 | Levy | |
| 9,785,440 B2 | 10/2017 | DeHon | |
| 10,410,626 B1* | 9/2019 | Sherstinsky | ........ H04M 3/5233 |
| 11,294,927 B2 | 4/2022 | Hrastnik | |
| 11,386,096 B2 | 7/2022 | Malik et al. | |
| 11,720,600 B1* | 8/2023 | Dixit | ...................... G06N 20/00 707/738 |
| 2014/0280230 A1 | 9/2014 | Masato et al. | |
| 2014/0365498 A1 | 12/2014 | Puntener et al. | |

(Continued)

OTHER PUBLICATIONS

Rooney, Sean, et al.; Building the enterprise data map; 2021 IEEE International Conference on Big Data (Big Data); Dec. 18, 2021; https://ieeexplore.ieee.org/abstract/document/9671608.

(Continued)

*Primary Examiner* — Mohammad S Rostami
(74) *Attorney, Agent, or Firm* — CPST Intellectual Property Inc.; Brett J. Slaney (57) ABSTRACT

A system, device and method are provided for assessing actions of authenticated persons within an enterprise system. The illustrative method includes extracting metadata comprising a plurality of categories from a plurality of data sources, and applying an unsupervised machine learning process to the extracted metadata. A plurality of clusters of the plurality of categories of the extracted metadata is generated, and thereafter one or more review criteria are applied thereto to generate curated clusters. The method includes training a supervised machine learning model with the curated clusters. The method includes, in response to receiving a new metadata input, processing the new metadata input with the trained supervised machine learning model. Data associated with the new metadata input is ingested based on respective clusters output by the trained supervised machine learning model for categories of the new metadata input.

20 Claims, 8 Drawing Sheets

(56) References Cited

U.S. PATENT DOCUMENTS

| | | | |
|---|---|---|---|
| 2021/0081848 A1* | 3/2021 | Polleri | G06F 11/3409 |
| 2021/0133163 A1 | 5/2021 | Fry | |
| 2021/0182996 A1* | 6/2021 | Cella | G06Q 10/083 |
| 2022/0035348 A1* | 2/2022 | Ma | G05B 13/048 |
| 2022/0075793 A1* | 3/2022 | Jezewski | G06N 5/04 |
| 2022/0121886 A1* | 4/2022 | Jahjah | G06F 18/24155 |
| 2022/0300400 A1* | 9/2022 | Bikkina | G06F 11/3684 |
| 2023/0023202 A1* | 1/2023 | Bierner | G06F 16/245 |
| 2023/0196453 A1* | 6/2023 | Shiu | G06F 16/285 |
| | | | 705/38 |
| 2024/0028925 A1* | 1/2024 | Kuduva | G06N 20/20 |
| 2024/0086311 A1* | 3/2024 | Meenal Kathiresan | |
| | | | G06F 40/30 |
| 2024/0346098 A1* | 10/2024 | Cicinyte | G06N 20/00 |

OTHER PUBLICATIONS

Wang, Lidong; Heterogeneous data and big data analytics; Automatic Control and Information Sciences, vol. 3, 2017 Issue1; pp. 8-15; http://pubs.sciepub.com/acis/3/1/3/.

* cited by examiner

SYSTEM AND METHOD FOR INGESTING DATA BASED ON PROCESSED METADATA

TECHNICAL FIELD

The following relates generally to ingesting data into remote systems, and more particularly to automating metadata processing for ingesting data.

BACKGROUND

Some existing systems rely on digital infrastructure to process the variety of digitized information from a variety of data sources. This can create technical challenges to integrate the various data, as applications can rely on a holistic view of all collected data to function. For example, relationships between the data sets may need to be discovered in order to perform a particular service.

Integrating the various data sources can be challenging. For example, different naming conventions can be used, different types of data can be used to represent the same events, data may be stored in different schemas depending on the data source, etc.

Existing processes associated with integrating the various data sources can be expensive, manual, and incomplete. An issue associated with some existing processes is that they provide some improvement (e.g., ease-of-use, accuracy, etc.) to manual integration, but not sufficient improvement to merit their continued use, or to attract the requisite required maintenance.

In addition, some existing processes are reliant on an already existing integration reference to manage the integration processes. That is, it can be difficult to implement new integration processes which may be more effective.

BRIEF DESCRIPTION OF THE DRAWINGS

Embodiments will now be described with reference to the appended drawings wherein.

DETAILED DESCRIPTION

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

It is understood that the use of the term metadata (as compared to data that the metadata describes or gives information about) in this disclosure can be used to refer to a plurality of data describing data. For example, the term metadata can include a source of data, titles of columns for relevant data, and titles of rows of data, parameters describing the types of data in a data table, etc.

Some existing integration approaches include extensive manual efforts to integrate metadata from various sources. For example, manual review may be required to identify that 'Prod id', 'P id', 'product id', 'prod id', etc., are technical metadata of the same column 'Product Identifier' but represented as different names in different applications or data sources. Some existing integrations can also place knowledge requirements on data engineers that are unrealistic, such as requiring them to remember various different nomenclatures for different subsystems. In these environments, the likelihood that the data engineer fails to retain the information (or leaves), results in difficulty in integrating the disparate data sources.

In addition, some existing integration approaches are unnecessarily binary and require adoption of a wholistic system or work poorly. This places enterprises in a difficult position: either the enterprise system infrastructure must be converted as a whole, or large amounts of investments are needed to convert to a holistic system, and transition costs can be large.

The approach proposed in this disclosure includes a metadata processor that can cluster metadata from different data sources using one or more machine learning techniques. The metadata clusters can be used at least in part as a reference for integration actions.

In some example embodiments, the proposed metadata processor can implement a two-part process: in a first part, unsupervised learning is used to generate one or more metadata clusters, which clusters define attributes or parameters of metadata for the different sources as being related. For example, Prod id, P id, product id, and prod id, may all be grouped in the same cluster by the unsupervised learning process. In a second part, the metadata processor uses the plurality of clusters learned through unsupervised learning to conduct a supervised learning process. The supervised learning process can thereafter be used to predict categories for new metadata for ingestion and facilitate more automated ingestion of the underlying data source. The process can be accomplished in piecemeal without disrupting existing systems. For example, the clustering can be performed only for those sources that are required to be updated, and a relational database can be generated to integrate any new standards.

The two-part approach can also incorporate into the supervised machine learning processes that incorporate relevant standards into the model. For example, certain industries (e.g., the banking industry, which relies on certain standards for services provided to customers, or for interbank interactions) can employ standards which need to be respected. The standards can be incorporated into the supervised learning process such that the supervised learning is adaptable to different standardized processes or incorporates in part an adherence with those standards.

A plurality of metadata processors can be instantiated to be used in different instances. This can provide extensibility, scalability, and robustness.

In one aspect, a system for ingesting data based on processed metadata is disclosed. The system includes a processor, a communications module coupled to the processor, and a memory coupled to the processor. The memory stores computer executable instructions that when executed by the processor cause the processor to extract metadata including a plurality of categories from a plurality of data sources, and apply an unsupervised machine learning process to the extracted metadata to generate a plurality of clusters of the plurality of categories of the extracted metadata. The instructions cause the processor to apply one or more review criteria to the generated plurality of clusters to generate a curated plurality of clusters, and train, with a supervised learning technique, a machine learning model with the curated plurality of clusters. The machine learning model can be trained to predict a relevant cluster for categories of input metadata. The instructions cause the processor to, in response to receiving a new metadata input, process the new metadata input with the trained supervised machine learning model. The instructions cause the processor to ingest data associated with the new metadata input based on respective clusters output by the trained supervised machine learning model, for categories of the new metadata input.

In example embodiments, the instructions cause the processor to extract the curated plurality of clusters into a relational database format. The instructions can cause the processor to receive a data structure indicating that metadata of a data source present in the relational database format is being altered, and parse the relational database format to determine affected downstream applications.

In example embodiments, applying one or more review criteria includes instructions causing the processor to generate an interface to receive input altering a composition of the plurality of clusters, the interface includes one or more flagged entries for review.

In example embodiments, the instructions cause the processor to receive data indicating errors associated with outputs of the trained supervised machine learning model, and retrain the trained supervised machine learning model based on the received data indicating errors. The instructions cause the processor to process new metadata with the re-trained supervised machine learning model.

In example embodiments, the unsupervised machine learning process employs Kmodes.

In example embodiments, the instructions cause the processor to automatically extract the new metadata input from a received data file from a data source to be ingested.

In example embodiments, the extracted metadata provided to the unsupervised machine learning process includes at least one of a data source, an attribute identifier, an associated application, an expected data type, and a data value.

In example embodiments, the instructions cause the processor to provide a validator that is automated, the validator relying on relationships captured by the plurality of curated clusters to validate different data sources in a same cluster of the plurality of curated clusters.

In example embodiments, to train the supervised machine learning model, the instructions cause the processor to train the supervised machine learning model with one or more pre-defined industry standards.

In one aspect, a method is disclosed that includes extracting metadata includes a plurality of categories from a plurality of data sources, and applying an unsupervised machine learning process to the extracted metadata. A plurality of clusters of the plurality of categories of the extracted metadata is generated, and thereafter one or more review criteria are applied thereto to generate curated clusters. The method includes training a supervised machine learning model with the curated clusters. The method includes, in response to receiving a new metadata input, processing the new metadata input with the trained supervised machine learning model. Data associated with the new metadata input is ingested based on respective clusters, output by the trained supervised machine learning model, for categories of the new metadata input.

In example embodiments, the method includes extracting the curated plurality of clusters into a relational database format.

In example embodiments, the method includes receiving a data structure indicating that metadata of a data source present in the relational database format is being altered, and parsing the relational database format to determine affected downstream applications.

In example embodiments, applying one or more review criteria includes generating an interface to receive input altering a composition of the plurality of clusters, the interface including one or more flagged entries for review.

In example embodiments, the method includes receiving data indicating errors associated with outputs of the trained supervised machine learning model; and retraining the trained supervised machine learning model based on the received data indicating errors. The method includes processing new metadata with the re-trained supervised machine learning model.

In example embodiments, the unsupervised machine learning process employs Kmodes.

In example embodiments, the method includes automatically extracting the new metadata input from a received data file from a data source to be ingested.

In example embodiments, the extracted metadata provided to the unsupervised machine learning process includes at least one of a data source, an attribute identifier, an associated application, an expected data type, and a data value range.

In example embodiments, the method includes providing a validator that is automated, the validator relying on relationships captured by the plurality of curated clusters to validate different data sources having categories grouped in a same cluster of the plurality of curated clusters.

In another aspect, a non-transitory computer readable medium for automating metadata processing is disclosed. The computer readable medium includes computer executable instructions for extracting metadata from a plurality of data sources, and applying an unsupervised machine learning process to the extracted metadata to generate a plurality of clusters of the extracted metadata. The instructions are for applying one or more review criteria to the generated plurality of clusters to generate a curated plurality of clusters, and training, with a supervised learning technique, a machine learning model with the curated plurality of clusters, the machine learning model being trained to predict a relevant cluster in response to input metadata. The instructions are for, in response to receiving a new metadata input, processing the new metadata input with the trained supervised machine learning model, and ingesting data associated with the new metadata input based on respective clusters output by the trained supervised machine learning model for categories of the new metadata input.

Figure 1:
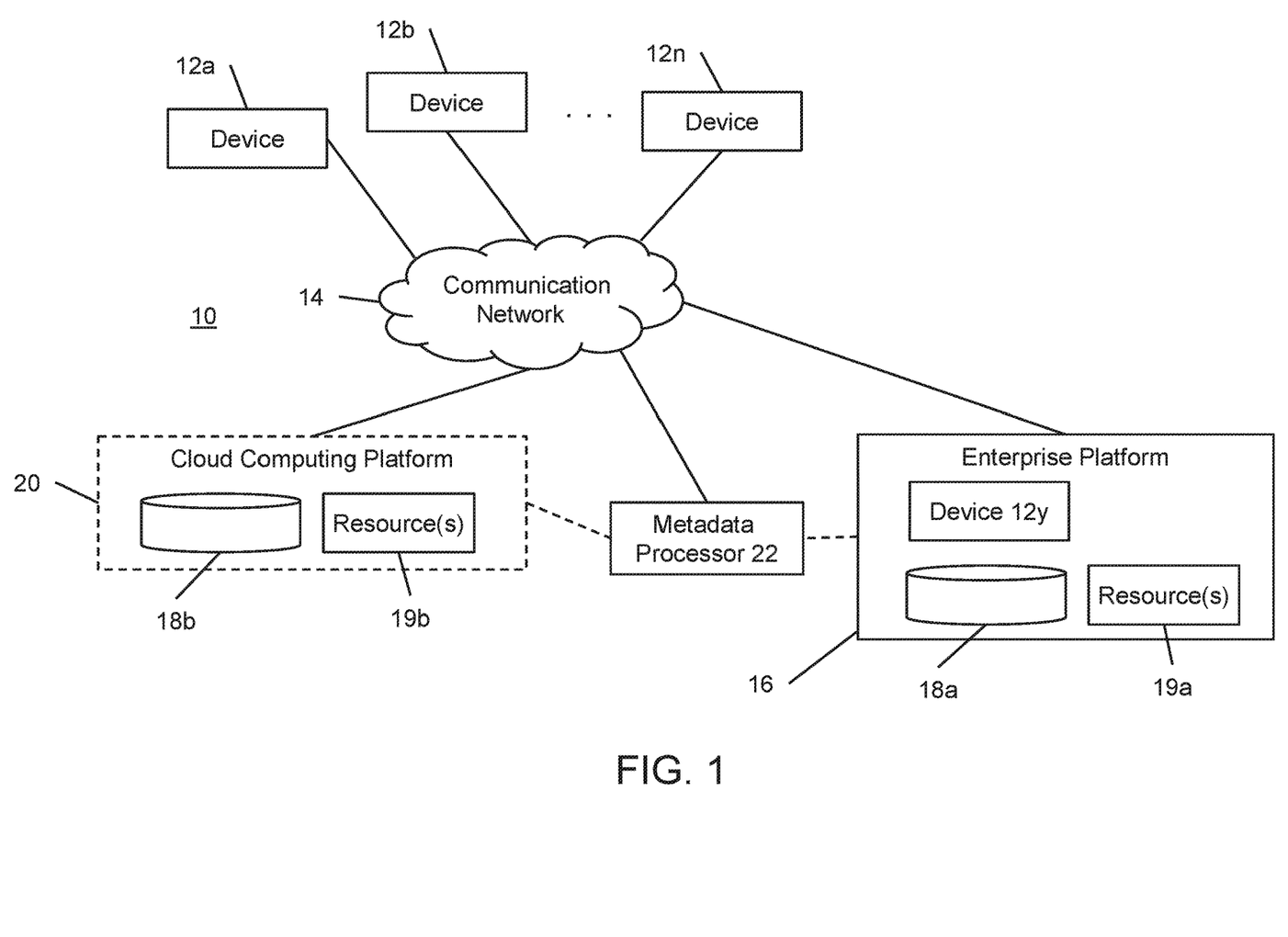
FIG. 1 is a schematic diagram of an example computing environment.

FIG. 1 illustrates an exemplary computing environment 10. The computing environment 10 can include one or more devices 12 for interacting with computing devices or elements within the environment 10 for implementing either an ingestion process or a metadata processing approach (as described herein), a communications network 14 connecting one or more components of the computing environment 10, an enterprise platform 16, and a cloud computing platform 20.

The enterprise platform 16 (e.g., a financial institution such as commercial bank and/or lender) stores data, in the shown example stored in a database 18a, that can be processed for one or more tasks (e.g., business analysis), or, optionally, data that is to be ingested into the cloud computing platform 20. For example, the enterprise platform 16 can provide a plurality of services via a plurality of enterprise resources (e.g., various instances of the shown database 18a, and/or computing resources 19a). While several details of the enterprise platform 16 have been omitted for clarity of illustration, reference will be made to FIG. 5 below for additional details.

The data the enterprise platform 16 can be responsible for at least in part sensitive data (e.g., financial data, customer data, etc.), data that is not sensitive, or a combination of the two. This disclosure contemplates an expansive definition of data that is not sensitive, including, but not limited to factual data (e.g., environmental data), data generated by an organization (e.g., monthly reports, etc.), personal data (e.g., work logs), etc. This disclosure contemplates an expansive definition of data that is sensitive, including client data, personally identifiable information, financial information, medical information, trade secrets, confidential information, etc.

The enterprise platform 16 includes resources 19a to facilitate metadata processing. For example, the enterprise platform 16 can include a communications module (e.g., module 122 of FIG. 5) to facilitate communication with a metadata processor 22 or cloud computing platform 20.

The cloud computing platform 20, whose involvement in metadata processing can be optional, can similarly include one or more instances of a database 18b, for example, for receiving data to be ingested, for storing ingested data, for storing metadata such as metadata clusters, database 18b instances in the form of relational databases, etc. Resources 19b of the cloud computing platform 20 can facilitate the ingestion of the data, or metadata processing (e.g., special purpose computing hardware to perform automations described herein). The ingestion and metadata processing can include a variety of operations, including but not limited to parsing data, transforming data, migrating data, enacting access controls, etc. Hereinafter, for ease of reference, the resources 18, 19, of the respective platform 16 or 20 shall be referred to generally as resources, unless otherwise indicated.

Devices 12 may be associated with one or more entities. Entities may be referred to herein as customers, clients, users, contractors, service providers, employees, management, correspondents, or other entities that interact with the enterprise platform 16 and/or cloud computing platform 20 (directly or indirectly). The computing environment 10 may include multiple devices 12, each device 12 being associated with a separate entity or associated with one or more entities. The devices can be external to the enterprise system (e.g., the shown devices 12a, 12b, to 12n, with which reviewers can interface with the metadata processing approach), or internal to the enterprise platform 16 (e.g., the shown device 12x, which can be controlled by a data scientist of the enterprise). In certain embodiments, an entity may operate device 12 such that device 12 performs one or more processes consistent with the disclosed embodiments. For example, the entity may use device 12 to curate generated clusters to confirm whether their respective composition is correct.

Devices 12 can include, but are not limited to, a personal computer, a laptop computer, a tablet computer, a notebook computer, a hand-held computer, a personal digital assistant, a portable navigation device, a mobile phone, a wearable device, a gaming device, an embedded device, a smart phone, a virtual reality device, an augmented reality device, third party portals, an automated teller machine (ATM), and any additional or alternate computing device, and may be operable to transmit and receive data across communication network 14.

Communication network 14 may include a telephone network, cellular, and/or data communication network to connect different types of devices 12. For example, the communication network 14 may include a private or public switched telephone network (PSTN), mobile network (e.g., code division multiple access (CDMA) network, global system for mobile communications (GSM) network, and/or any 3G, 4G, or 5G wireless carrier network, etc.), Wi-Fi or other similar wireless network, and a private and/or public wide area network (e.g., the Internet).

The cloud computing platform 20 and/or enterprise platform 16 may also include a cryptographic server (not shown) for performing cryptographic operations and providing cryptographic services (e.g., authentication (via digital signatures), data protection (via encryption), etc.) to provide a secure interaction channel and interaction session, etc. Such a cryptographic server can also be configured to communicate and operate with a cryptographic infrastructure, such as a public key infrastructure (PKI), certificate authority (CA), certificate revocation service, signing authority, key server, etc. The cryptographic server and cryptographic infrastructure can be used to protect the various data communications described herein, to secure communication channels therefor, authenticate parties, manage digital certificates for such parties, manage keys (e.g., public, and private keys in a PKI), and perform other cryptographic operations that are required or desired for particular applications of the cloud computing platform 20 and enterprise platform 16. The cryptographic server may, for example, be used to protect any data of the enterprise platform 16 when in transit to the cloud computing platform 20, or within the cloud computing platform 20 (e.g., data such as financial data and/or client data and/or transaction data within the enterprise) by way of encryption for data protection, digital signatures or message digests for data integrity, and by using digital certificates to authenticate the identity of the entities and devices 12 with which the enterprise platform 16 and/or cloud computing platform 20 communicates to ingest data. It can be appreciated that various cryptographic mechanisms and protocols can be chosen and implemented to suit the constraints and requirements of the particular deployment of the cloud computing platform 20 or enterprise platform 16 as is known in the art.

The environment 10 includes a metadata processor 22 for at least in part automatically integrating metadata associated with data stored on the enterprise platform 16.

It can be appreciated that while the metadata processor 22, cloud computing platform 20 and enterprise platform 16 are shown as separate entities in FIG. 1, they may also be utilized at the direction or otherwise under the control of a single party, or all be provided by different parties, etc. For example, the cloud computing platform 20 can be a service provider to the enterprise platform 16, such that resources of the cloud computing platform 20 are provided for the benefit of the enterprise platform 16. Similarly, the metadata processor 22 can originate within the enterprise platform 16, and be implemented via the cloud computing platform 20, or as a standalone system provided by a third party, etc.

Figure 2:
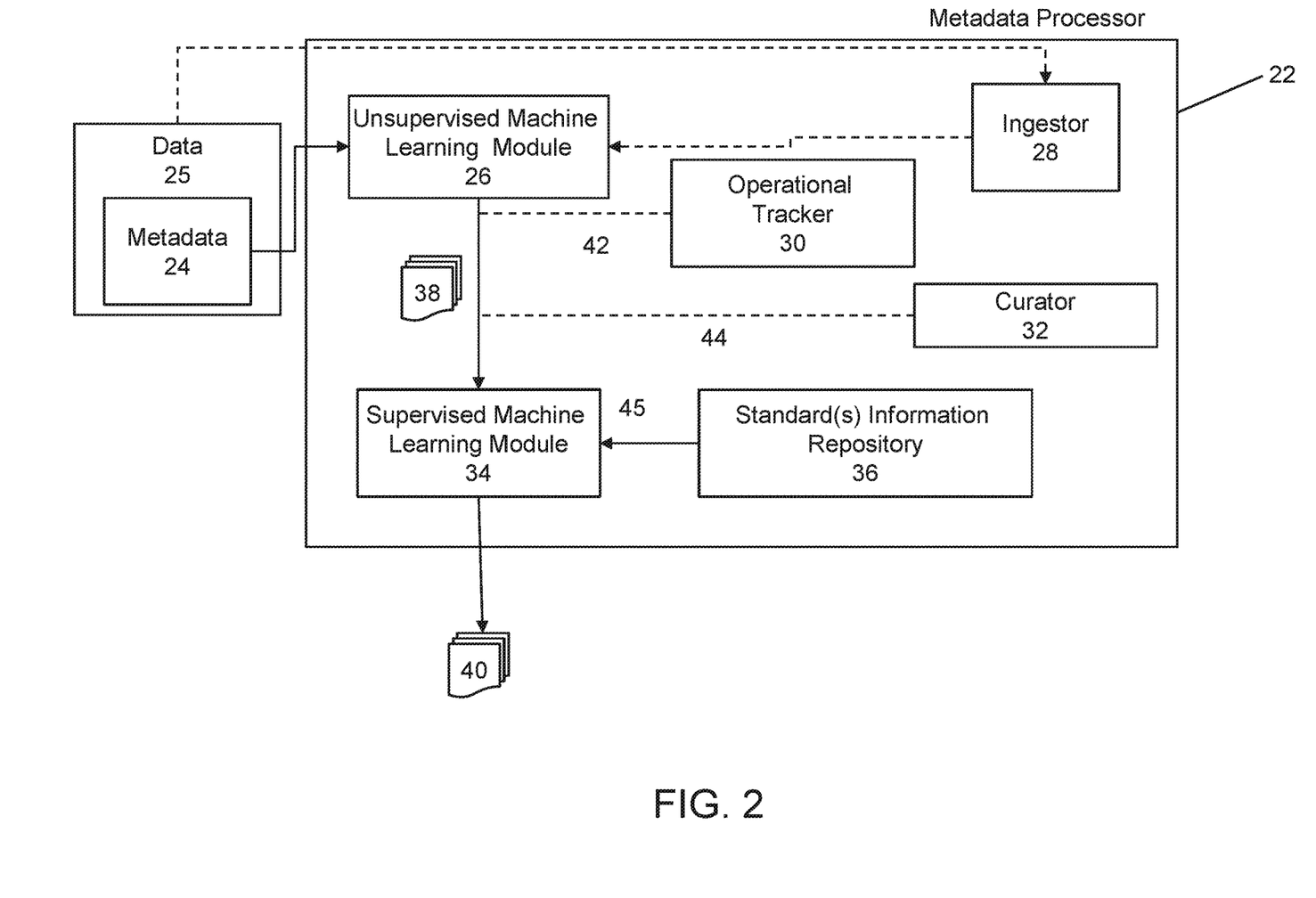
FIG. 2 is a block diagram of an example configuration for a metadata processor according to the disclosure herein.

FIG. 2 shows a block diagram of an example metadata processor 22. In FIG. 2, the metadata processor 22 is shown as including a variety of components, such as an unsupervised machine learning module 26, an ingestor 28, and operational tracker 30, a curator 32, a supervised machine learning module 34, and a standards information repository 36. It is understood that the shown configuration is illustrative (e.g., different configurations are possible, where, for example, the operational tracker 30 is located on other than the metadata processor 22, or the metadata processor 22 includes multiple instances of the unsupervised machine learning module 26), and is not intended to be limiting.

The unsupervised machine learning module 26 can include computer executable instructions that, when executed by a processor(s), applies unsupervised machine learning techniques to input data. In example embodiments, the unsupervised machine learning module 26 includes a plurality of unsupervised machine learning techniques, and different techniques are used for different instances of the metadata processor 22. The unsupervised machine learning techniques can include, for example, one of the following techniques: K-means, K-modes, mean shift, spectral clustering, etc.

The unsupervised machine learning module 26 generates a plurality of clusters, shown as the clusters 38 in FIG. 2. The clusters 38 can be defined by categories of attributes of input metadata (e.g., a column name), forming relative groupings of those attributes or properties. For example, one cluster 38 can be a cluster of the metadata defining a product ID in different databases 18a (e.g., product ID, prod ID, Prod, etc.), and another cluster of the clusters 38 can be a grouping of metadata defining sales data (e.g., sales, $, revenue, etc.).

The unsupervised machine learning module 26 can be configured to create the clusters 38 based on metadata 24 directly, or via an indirect process. For example, as shown in FIG. 2, the metadata 24 can be received from an ingestor 28.

The ingestor 28 can be used to automatically extract metadata 24 from an input data file 25. For example, the ingestor 28 can be used to parse the data file according to one or more schemas (e.g., fixed length, comma delimited, etc.), and determine the relevant metadata 24. In another example, the ingestor 28 can extract metadata 24 from the data source 18 associated with the data file 25, and based on a relational database (not shown in FIG. 3) determine the relevant metadata 24.

In example embodiments, the ingestor 28 is preconfigured to extract only certain metadata. For example, the ingestor 28 can be configured to avoid extracting metadata that relates to unpopulated entries, or to only extract metadata that relates to features that are not already registered in a relational database (e.g., database 52 of FIG. 3B), etc.

The unsupervised machine learning module 26 can be configured to process only certain of the extracted metadata 24. For example, the unsupervised machine learning module 26 can process metadata related to categorical variables to generate clusters thereof.

The supervised machine learning module 34 can include computer executable instructions that, when executed by a processor(s), applies supervised machine learning model techniques to input data. In example embodiments, the supervised machine learning module 34 includes a plurality of supervised machine learning techniques that are applied to different instances of the metadata processor 22. A plurality of supervised machine learning techniques are contemplated by this disclosure, and can include different components. For example, different activators can be used, different initiation schemes can be used, different learning steps can be used, etc.

The supervised machine learning modules 34 can use the machine learning techniques to train a machine learning model 40 to predict a relevant cluster for attributes of input metadata 24. The prediction can group the attributes, for example, according to the generated clusters 38. To provide a particularized example, the supervised machine learning module 34 can train machine learning model 40 with metadata 24 as the input data, and the clusters 38 as the labels used for assessing error.

The operational tracker 30 can be used to collect data related to the performance of the machine learning model 40. For example, a data scientist can use the machine learning model 40 to generate a new metadata standard or reference metadata document for an enterprise system 16. The outputs of the machine learning model 40 can output predicted clusters 38 which are not completely correct, and the data scientist can update the clusters 38 to improve accuracy. The operational tracker 30 can capture these changes to the cluster 38 composition. The updates can be incorporated via re-training the model 40 with the updated clusters.

In another example, the clusters 38 can be updated over time, expanding, shrinking, or evolving, and similarly require re-training of the model 40.

In example embodiments, the machine learning model 40 can be required to provide the operational tracker 30 with the second most likely predicted pertinent cluster 38. The operational tracker 30 can track whether the second most likely predicted pertinent cluster 38 is more often accurate, indicating that retraining of the model 40 may be required.

The curator 32 can be used to review the clusters 38 with one or more review parameters. The review parameters (not shown) can include preconfigured review parameters (e.g., a cluster is labelled by a complete English word). The review parameters can include review parameters solicited from an entity. For example, the curator 32 can generate an interface for receiving input to alter a composition of the clusters 38 (e.g., input by a data scientist). The input can be required to be received from a plurality of individuals (e.g., a data scientist, a data steward, etc.), or a minimum threshold of individuals, etc., The standard information repository 36 can include labeled instances of metadata which comply with one or more industry standards. For example, the banking industry includes standards such as International Standards Organization (ISO) 20022, Market Data Definition Language (MDDL), etc., and the standards information repository 36 can include labeled instances of metadata in the relevant standard. In example embodiments, the standards information repository 36 is a plurality of labeled instances of metadata for different standards, which different standards can be applied for different instances of processors 22.

Referring again to the supervised machine learning module 34, training the machine learning model 40 can include the clusters 38 and data from other components of the metadata processor 22. For example, in at least some example embodiments, and as shown by process 42, the operational tracker 30 can receive data indicating errors associated with outputs of the supervised machine learning model 40. The supervised machine learning module 34 can then re-train the model 40 based on the received data indicating the errors. In another example, as shown by process 44, the clusters 38 can be modified by curating the clusters 38 prior to being then provided to the supervised machine learning module 34. These curated clusters 38 can be used to generate the machine learning model 40. In yet another example (shown by process 45), at least some of the labeled metadata within the standard information repository 36 is provided to the supervised machine learning module 34 as another set of training data (e.g., in addition to the clusters 38).

The described examples of training the machine learning model 40 with the module 34 are not mutually exclusive. For example, the supervised machine learning module 34 can be configured to train model 40 only with curated clusters 38, the module 34 can be configured to train model 40 based on curated clusters 38 and on the labeled metadata in the repository 36, the module 34 can be configured to train model 40 based on the curated clusters 38 and another set of labeled data (not shown), etc.

Figure 3A:
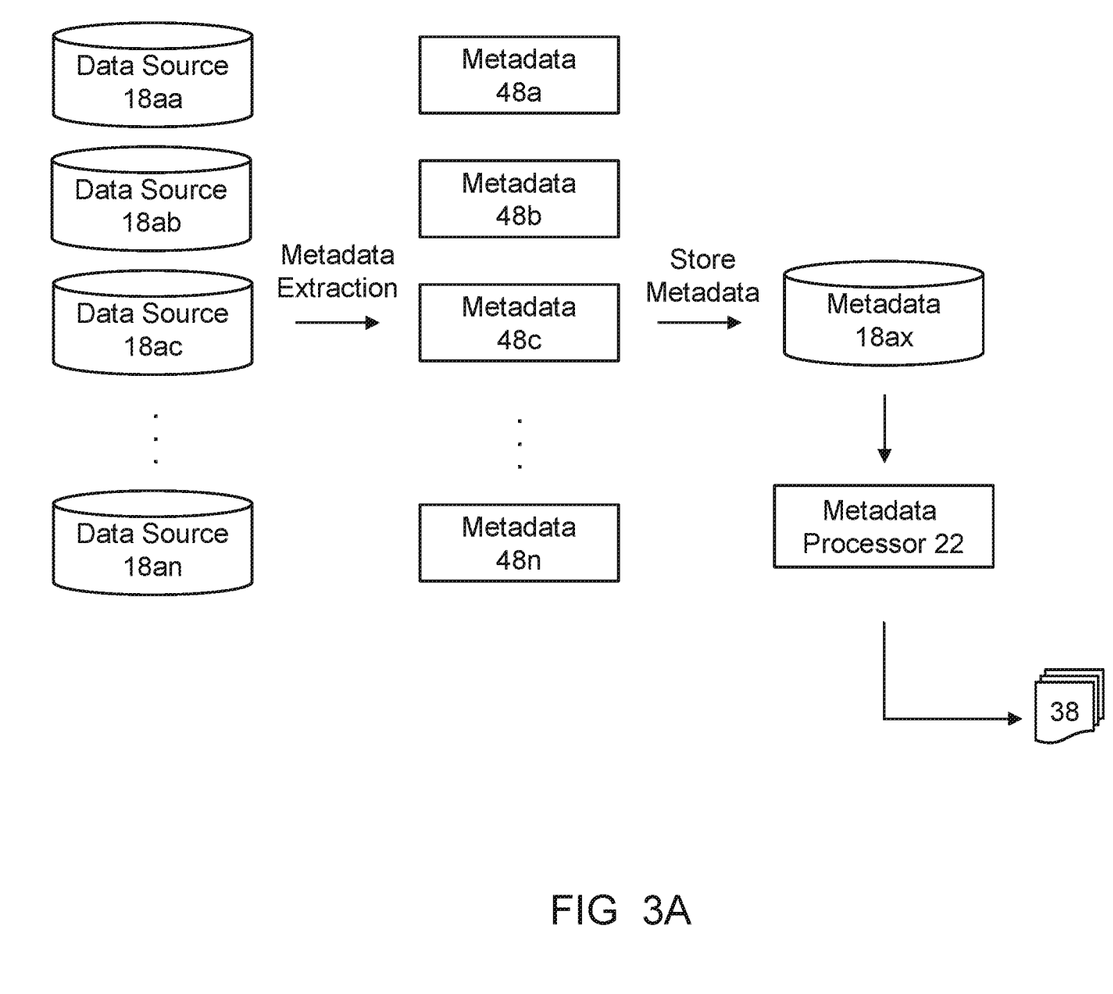
FIGS. 3A and 3B are each a block diagram of an example process for processing metadata according to the disclosure herein.
Figure 3B:
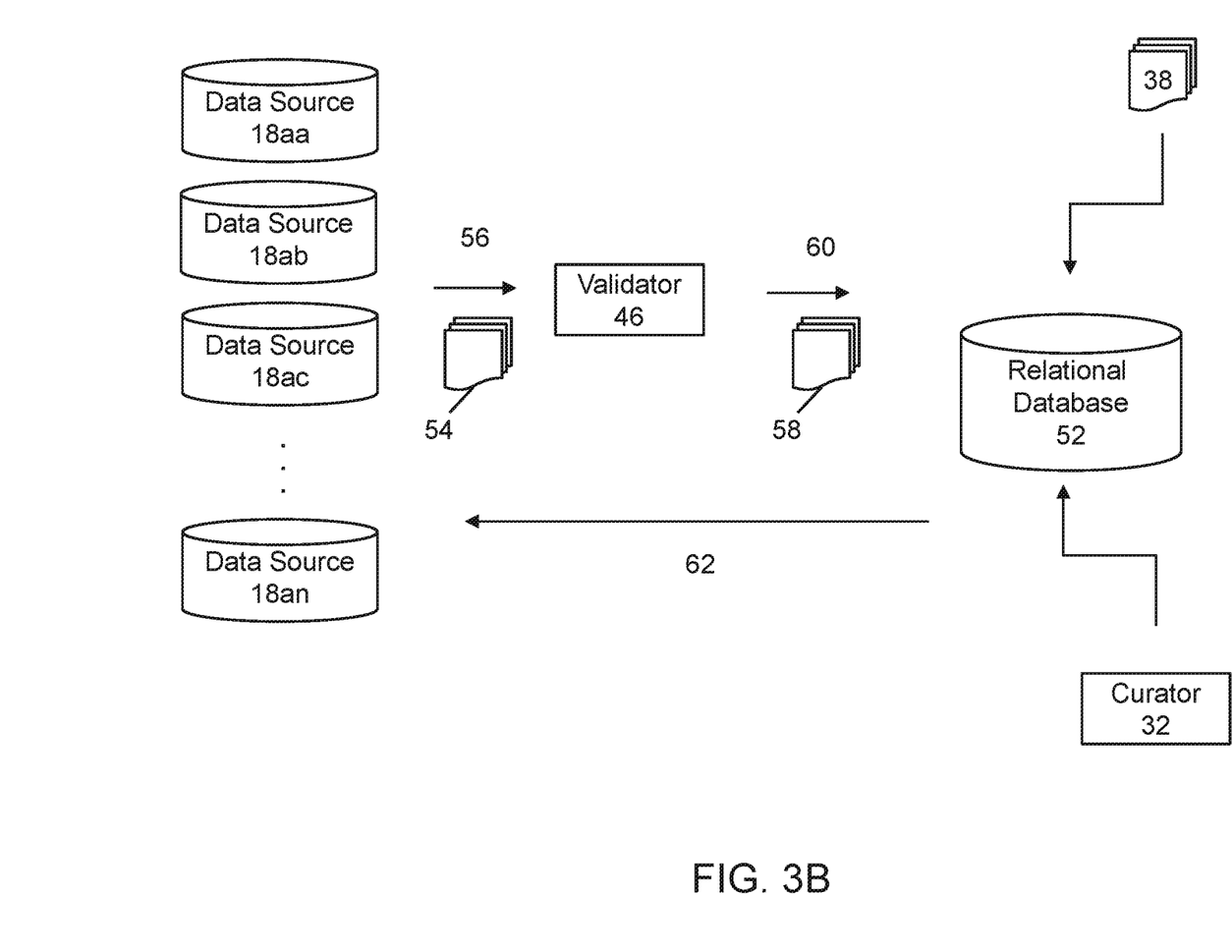

Reference is now made to FIGS. 3A, and 3B, which each show a block diagram of an example process for processing metadata.

In FIG. 3A, a plurality of data sources 18 are shown (i.e., data sources 18aa, 18ab, 18ac to 18an).

Metadata from these data sources is extracted (e.g., via the ingestor 28). The extracted metadata, shown respectively as metadata 48a, 48b, 48c, to 48n, can include a plurality of different categories. For example, the categories can include a category for: an identification of the data source 18 from which the metadata originates, an attribute identifier for the various attributes stored in the data source 18, an application associated with the data source 18 (e.g., a market data application, a human resources application etc.), an expected data type (e.g., strain, integer, etc.), and data value range (e.g., an expected data value range, where data from nature resource may be expected to only show seniority levels up to forty years, or orders in the amounts of thousands for office expenses), etc.

The extracted metadata 48 can be integrated into a single data store, shown as data store 18ax, which can be accessed by the metadata processor 22. The metadata processor 22 can identify at least one attribute in the plurality of extracted metadata 48 that is sufficiently similar between all the different data sources 18 which contributed to the data store 18ax, and categorize those similar attributes together in a cluster. In this way, the metadata processor 22 can extract and store metadata using attributes within the data store 18ax to generate a plurality of metadata clusters (shown as clusters 38). The metadata clusters 38 can be used to process other extracted metadata and to enable similar metadata to be labeled or flagged for subsequent workflow processing. In example embodiments, only one or the other of the unsupervised machine learning module 26 and the supervised machine learning module 34 are used to generate the clusters 38, or both modules are used as described in FIG. 2, etc.

Referring now to FIG. 3B, a block diagram of an example process for processing metadata according to the disclosure herein shown.

In FIG. 3B, a relational database 52 can be generated based on the generated clusters 38. For example, the relational database 52 can store the interrelationships in the clusters 38 (e.g., curated clusters 38) all together in a single database, such that a reviewer can quickly determine different attribute clusters for different data sources. The relational database 52 can also include data in addition to the clusters 38. For example, the relational database 52 can include commentary on expected changes, detail certain permissions for enacting changes to the relational database 52, etc.

One or more changes 54 can be proposed to the relational database 52 based on changes to the one or more data sources 18. The one or more proposed changes 54 can include inputs to change certain metadata attributes locally, to introduce new metadata attributes, to remove metadata attributes, etc.

The validator 46, through process 56, can be configured to listen for changes 54 in metadata attributes of one or more data sources 18 of the enterprise platform 16. The validator 46 can be for maintaining consistency of metadata attributes within an enterprise platform 16 and updating the relational database 52. The validator 46 can parse the proposed changes 54, and provide queries/requests 58 (e.g., via process 60, and hereinafter referred to as queries 58, for ease of reference) to the relational database 52.

The queries 58 can take a variety of forms. In one example, a query 58 can include a request to change metadata attribute, where data sources 18 are prohibited from changing metadata attributes without approval. In another example, the query 58 can include a notification that a metadata attribute has been changed, added, etc. The relational database 52 can be queried to determine if updates are needed based on the changes 54. For example, if a new metadata attribute is introduced to a data source 18, the relational database 52 may seek to determine an appropriate cluster 38 for attributes of the new database based on metadata clusters. The relational database 52 may return the relevant cluster 38 to the validator 46 to in turn inform the data source 18 of equivalents, or to enable the validator 46 to listen to subsequent requests for the relevant attribute cluster 38 and ensure that such a request includes the new metadata attribute.

In at some example embodiments, for example where the clusters 38 are used to create standardized metadata attributes across different data sources 18, the validator 46 can use the relational database 52 to update other data sources 18 with the proposed change 54. For example, if a master customer list data source 18 is updated with a different or new metadata attribute, that metadata attribute can be populated to all other interested data sources 18 for consistency. In at least some examples, new data sources 18 are required by the validator 46 to comply with the clusters 38 represented in the relational database 52.

The validator 46 can generate one or more notifications in response to determining the changes 54 can affect downstream applications. For example, where change 54 changes in existing metadata attribute, the validator 46 can determine, in correspondence with the relational database 52, that at least one downstream application relies on programming interfaces (APIs) based on existing metadata attributes. A notification can be generated to the entity proposing the change 54, or to entities managing affect the downstream applications to prepare for the changes 54.

In at least some example embodiments, it is contemplated that processes 60 and 56 are also reversible (as shown by process 62). That is, changes to the metadata stored in the relational database 52 can be propagated through queries 58 through the validator 46. For example, the curator 32 can generate one or more interfaces to receive input to relationships stored in the database 52. An entity can determine and provide input to an interface that the relational database 52 includes errors, that data sources 18 are being moved, etc.

In example embodiments, not shown, the clusters 38 generated by the module 26 are first stored in the relational database 52, and curation occurs via the interface generated by the curator 32 to interact with the relational database 52. For example, this type of procedure may be used when a large overhaul to metadata attribute linkages is being proposed.

Figure 4:
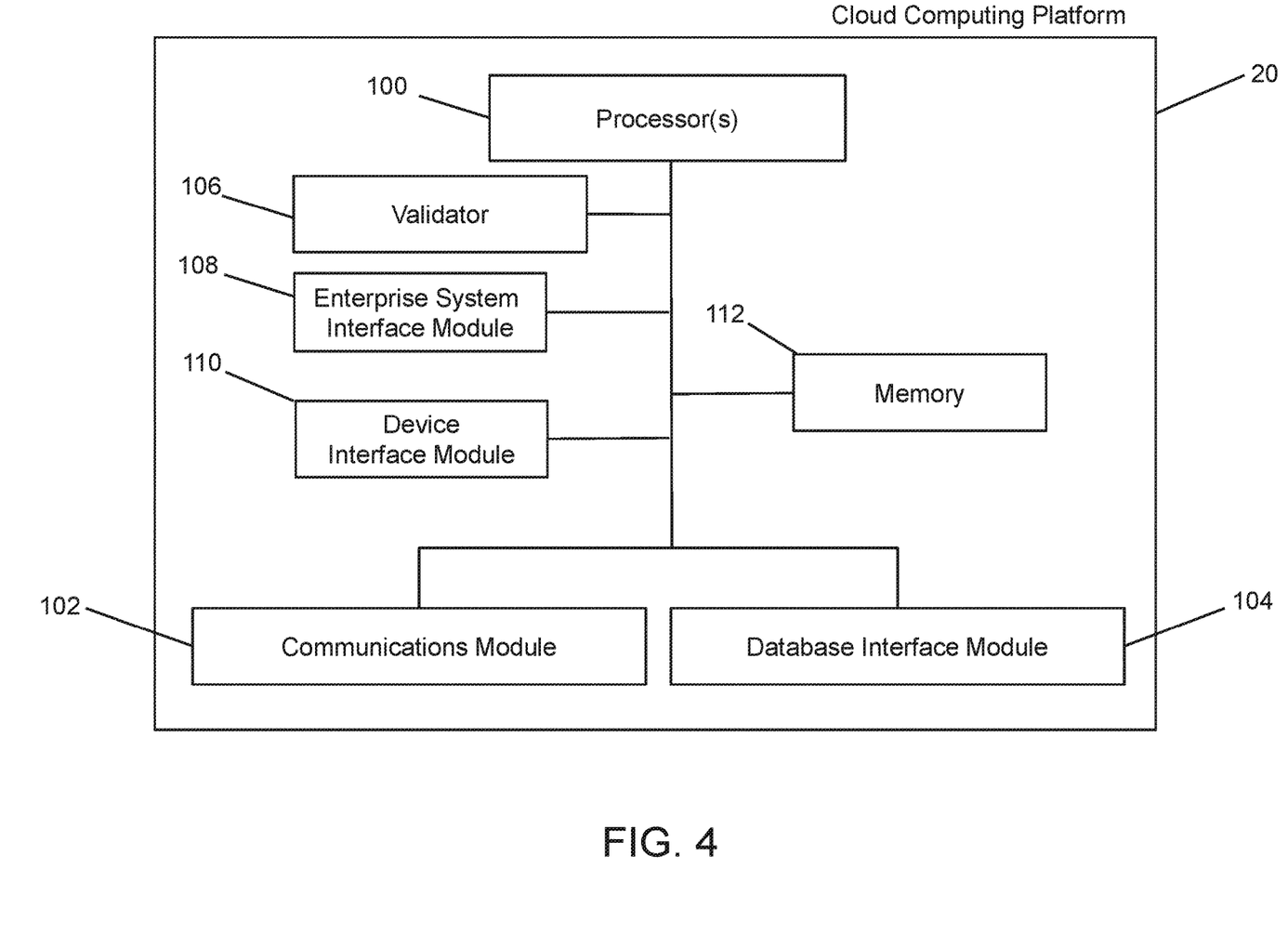
FIG. 4 is a block diagram of an example configuration of a cloud computing platform according to the disclosure herein.

Referring now to FIG. 4, a block diagram of an example configuration of a cloud computing platform 20 is shown. FIG. 4 illustrates examples of modules, tools and engines stored in memory 112 on the cloud computing platform 20 and operated or executed by the processor 100. It can be appreciated that any of the modules, tools, and engines shown in FIG. 4 may also be hosted externally and be available to another cloud computing platform 20, e.g., via the communications module 102.

In the example embodiment shown in FIG. 4, the cloud computing platform 20 includes a database interface module 104, a validator 106, an enterprise system interface module 108, a device interface module 110, and a relational database 114.

The database interface module 104 can be used for communicating with different instances of the database 18*a*. For example, direct communication between the cloud platform 20 and the market data database 18 can be established via the database interface module 104.

The validator 106 can be computer executable instructions to validate one or more operations performed based on generated clusters 38, as described herein.

An access control module (e.g., shown as reference 172 in FIG. 6) may be used to apply a hierarchy of permission levels or otherwise apply predetermined criteria to determine what aspects of the cloud computing platform 20 can be accessed, what resources 18, 19 can be accessed and by whom, and/or how related data can be shared with which entity in the computing environment 10, etc. For example, the cloud computing platform 20 may grant certain employees of the enterprise platform 16 access to only databases 18*b*, but not other resources. In another example, the access control module can be used to control which entities are permitted to alter or provide validators 46, input to curator(s) 32, or the relational database 52, etc. As such, the access control module can be used to control the sharing of resources 18, 19, either between platforms 16, 20, or between platforms 16, 20 and devices 12 or users thereof, whether based on a type of client/user, a permission or preference, or any other restriction imposed by the enterprise platform 16, the computing environment 10, or application.

The enterprise system interface module 108 can provide a graphical user interface (GUI), software development kit (SDK) or API connectivity to communicate with the enterprise platform 16. It can be appreciated that the enterprise system interface module 108 may also provide a web browser-based interface, an application or "app" interface, a machine language interface, etc. Similarly, the device interface module 110 can provide a graphical user interface (GUI), software development kit (SDK) or API connectivity to communicate with devices 12. In at least some example embodiments, the curator 32 relies on the GUI generation of the computing platform 20 (or the enterprise platform 16) to serve interfaces for receiving input. The database interface module 104 can facilitate direct communication with database 18*a*, 18*b*, such as other instances of database 18*a* stored on other locations of the enterprise platform 16.

Figure 5:
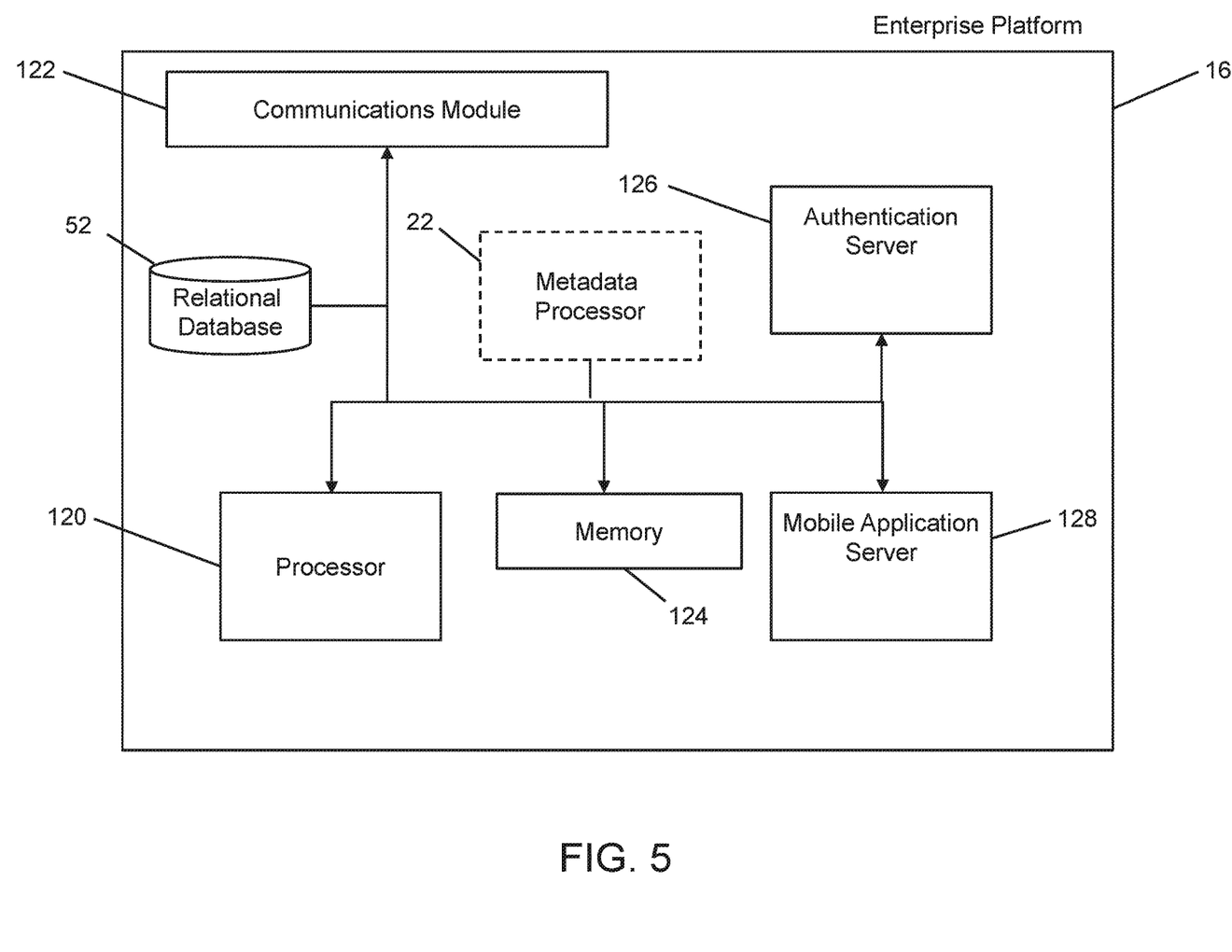
FIG. 5 is a block diagram of an example configuration of an enterprise system.

In FIG. 5, an example configuration for an enterprise platform 16 is shown. In certain embodiments, similar to the cloud computing platform 20, the enterprise platform 16 may include one or more processors 120, a communications module 122, a database interface module (not shown) for interfacing with the remote or local datastores to retrieve, modify, and store (e.g., add) data to the resources 18*a*, 19*a*.

Communications module 122 enables the enterprise platform 16 to communicate with one or more other components of the computing environment 10, such as the cloud computing platform 20 (or one of its components), via a bus or other communication network, such as the communication network 14. The enterprise platform 16 can include at least one memory or memory device 124 that can include a tangible and non-transitory computer-readable medium having stored therein computer programs, sets of instructions, code, or data to be executed by processor 120.

FIG. 5 illustrates examples of modules, tools and engines stored in memory on the enterprise platform 16 and operated or executed by the processor 120. It can be appreciated that any of the modules, tools, and engines shown in FIG. 5 may also be hosted externally and be available to the enterprise platform 16, e.g., via the communications module 122.

In the example embodiment shown in FIG. 5, the enterprise platform 16 can include at least part of the metadata processor 22, at least part of the relational database 52, an authentication server 126, for authenticating entities to access resources 18*a*, 19*a*, of the enterprise, and a mobile application server 128 to facilitate a mobile application that can be deployed on mobile devices 12. The enterprise platform 16 can include an access control module (not shown), similar to the cloud computing platform 20. In at least some example embodiments, at least part of the metadata processor 22 and the relational database 52 are hosted on the cloud computing platform 20.

Figure 6:
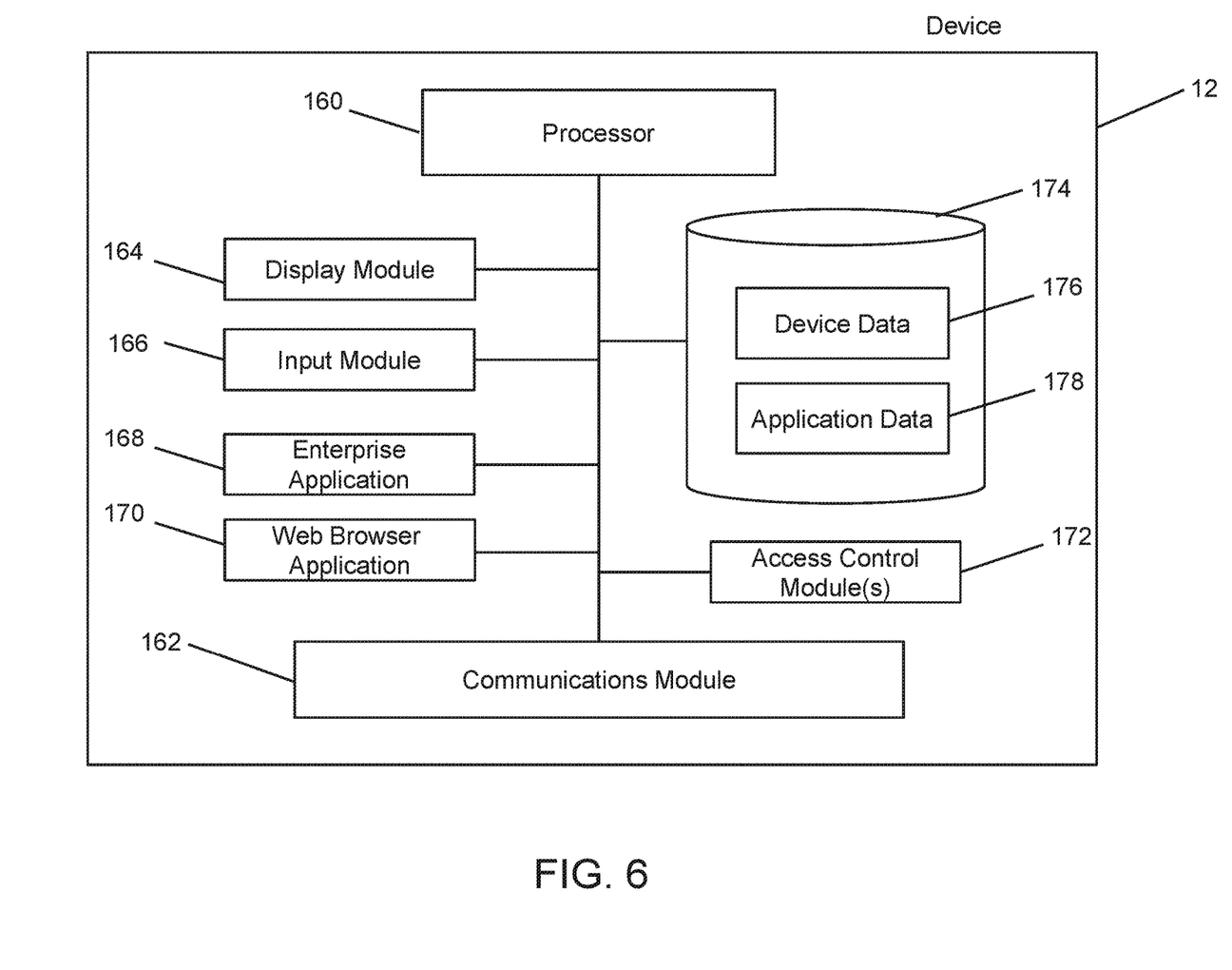
FIG. 6 is a block diagram of an example configuration of a device.

In FIG. 6, an example configuration of a device 12 is shown. In certain embodiments, the device 12 may include one or more processors 160, a communications module 162, and a data store 174 storing device data 176 (e.g., data needed to authenticate with a cloud computing platform 20 to perform ingestion), an access control module 172 similar to the access control module described in respect of FIG. 5, and application data 178 (e.g., data to enable communicating with the enterprise platform 16 to enable transferring of database 18*a* to the cloud computing platform 20). Communications module 162 enables the device 12 to communicate with one or more other components of the computing environment 10, such as cloud computing platform 20, or enterprise platform 16, via a bus or other communication network, such as the communication network 14. While not delineated in FIG. 6, similar to the cloud computing platform 20 the device 12 includes at least one memory or memory device that can include a tangible and non-transitory computer-readable medium having stored therein computer programs, sets of instructions, code, or data to be executed by processor 160. FIG. 6 illustrates examples of modules and applications stored in memory on the device 12 and operated by the processor 160. It can be appreciated that any of the modules and applications shown in FIG. 6 may also be hosted externally and be available to the device 12, e.g., via the communications module 162.

In the example embodiment shown in FIG. 6, the device 12 includes a display module 164 for rendering GUIs and other visual outputs on a display device such as a display screen, and an input module 166 for processing entity or other inputs received at the device 12, e.g., via a touchscreen, input button, transceiver, microphone, keyboard, etc.

The device 12 may also include an enterprise application 168 provided by the enterprise platform 16, e.g., for submitting requests to transfer data from the database 18*a* to the cloud. The device 12 in this example embodiment also includes a web browser application 170 for accessing Internet-based content, e.g., via a mobile or traditional website and one or applications (not shown) offered by the enterprise platform 16 or the cloud computing platform 20. The data store 174 may be used to store device data 176, such as, but not limited to, an IP address or a MAC address that uniquely identifies device 12 within environment 10. The data store 176 may also be used to store authentication data, such as, but not limited to, login credentials, user preferences, cryptographic data (e.g., cryptographic keys), etc.

It will be appreciated that only certain modules, applications, tools, and engines are shown in FIGS. 4 to 6 for ease of illustration and various other components would be provided and utilized by the cloud computing platform 20, enterprise platform 16, and device 12, as is known in the art.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by an application, module, or both. Any such computer storage media may be part of any of the servers or other devices in cloud computing platform 20 or enterprise platform 16, or device 12, or accessible or connectable thereto. Any application or module herein described may be implemented using computer readable/executable instructions that may be stored or otherwise held by such computer readable media.

Figure 7:
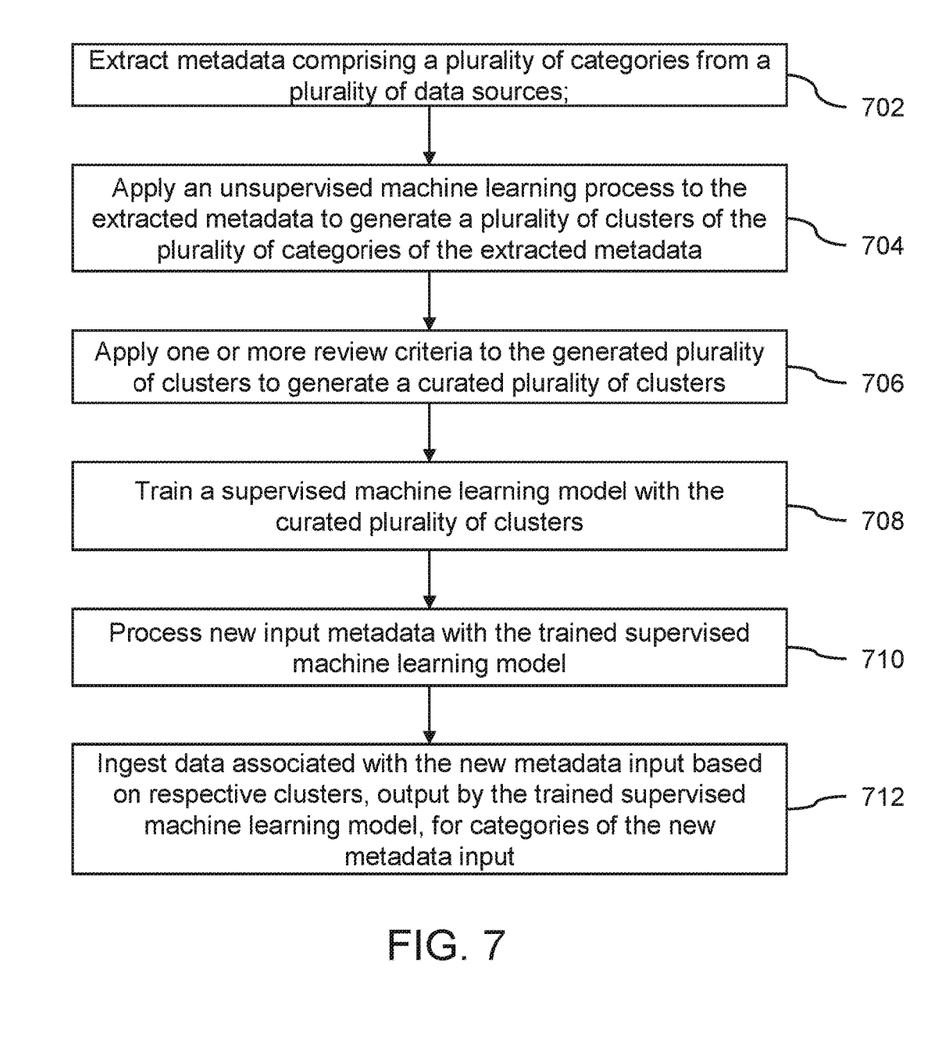
FIG. 7 is a flow diagram of an example method performed by computer executable instructions for assessing actions of authenticated persons within an enterprise system.

Referring to FIG. 7, a flow diagram of an example method performed by computer executable instructions for ingesting data based on processed metadata. It is understood that the method shown in FIG. 7 may be automatically completed in whole by the metadata processor 22, or only part of the blocks shown therein may be completed automatically by the metadata processor 22. It is also understood that references to the preceding figures to discuss FIG. 7 are illustrative, and not intended to be limiting.

At block 702, metadata comprising a plurality of categories for a plurality of data sources 18 (e.g., the metadata 48 shown in FIG. 3A) is extracted. In an example embodiment, the ingestor 28 extracts the metadata from a received data file (e.g., data file 25) to automatically extract the metadata.

At block 704, an unsupervised machine learning process is applied to the extracted metadata to generate a plurality of clusters of the plurality of categories of the extracted metadata. For example, the unsupervised machine learning module 26 can be used to generate the clusters 38. For example, the clusters of the plurality of categories can include the metadata attributes described herein.

At block 706, one or more review criteria are applied to the generated plurality of clusters to generate a curated plurality of clusters. For example, the curator 32, can evaluate the review criteria to potentially revise the composition of the clusters 38, resulting in the curated clusters.

At block 708, a machine learning model (e.g., model 40) is trained with a supervised machine learning technique based on the plurality of clusters generated in block 706. The machine learning model learns to predict a relevant cluster for a metadata attribute in response to input metadata attributes. For example, new input metadata which includes an attribute description of "sls yoy," can be predicted to be related to a yearly sales metrics cluster. Block 708 can include generating a plurality of predictions for a matching plurality of metadata attributes for any newly input metadata. For example, metadata of a data source 18 that includes forty different columns can be preprocessed into an array with thirty different elements to be provided to the trained machine learning model, and the trained machine learning model can provide a predicted relevant cluster for each of the different elements.

At block 710, new input metadata (e.g., metadata not provided for the training of the supervised machine learning model) is processed with the trained model 40. The trained model 40 can generate the predicted clusters for the metadata attributes.

A block 712, data associated with the new input metadata can be ingested based on the respective clusters output by the trained model 40. For example, if a new data source 18 is being ingested from enterprise platform 16 for storage in the cloud platform 20, the ingestion can include the creation of a configuration file that converts metadata attributes of the new data source 18 based on the clusters predicted by the trained model 40. In this way, ingestion of new data sources 18 can be potentially accelerated. Continuing the earlier example, attributes which are clustered as yearly sales metrics can be ingested to be consistent with the data from other databases which are predicted as being in the same cluster.

The ingestion based on processed metadata described herein may also be beneficially employed to existing data sources 18 which already include some amount of metadata integration. For example, where different data sources 18 have been digested into separate silos of an enterprise platform 16, the proposed metadata clustering can potentially accelerate an integration between the different silos relatively quicker than determining an entirely new integration scheme for the whole enterprise.

The disclosed approach can also be used as a tool to integrate metadata piecemeal. For example, the disclosed approach can include generating clusters 38, and only using automated ingestion for the best-defined clusters 38. For example, where two clusters have a low degree of dissimilarity, or the composition of a cluster has a low confidence metric associated therewith, those clusters can be flagged for further review before being enabled in an automated integration approach.

It will be appreciated that the method shown in FIG. 7 is illustrative, and that other methods are contemplated by this disclosure. For example, block 708 can be completed in part prior to the generation of clusters 38 by training a supervised machine learning model with standard information from the standards information repository 36.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A system for ingesting data based on processed metadata, the system comprising:
   a processor;
   a communications module coupled to the processor; and
   a memory coupled to the processor, the memory storing computer executable instructions that when executed by the processor cause the processor to:
      extract metadata comprising a plurality of categories from a plurality of data sources;
      apply an unsupervised machine learning process to the extracted metadata to generate a plurality of clusters of the plurality of categories of the extracted metadata, the clusters defining attributes or parameters of metadata for the plurality of data sources as being related;
      apply one or more review criteria to the generated plurality of clusters to generate a curated plurality of clusters;
      train, with a supervised learning technique, a machine learning model with the curated plurality of clusters, the machine learning model being trained to predict a relevant cluster for categories of input metadata;
      receive a new metadata input;
      process the new metadata input using the trained supervised machine learning model and output at least one predicted cluster for the new metadata input based on metadata attributes; and
      ingest data associated with the new metadata input based on respective ones of the at least one predicted cluster output by the trained supervised machine learning model for categories of the new metadata input, wherein ingesting the data comprises converting at least one metadata attribute for at least a portion of the data associated with the new metadata input to be consistent with other data predicted as being from a same predicted cluster.

2. The system of claim 1, wherein the instructions cause the processor to:
   extract the curated plurality of clusters into a relational database format.

3. The system of claim 2, wherein the instructions cause the processor to:
   receive a data structure indicating that metadata of a data source present in the relational database format is being altered; and
   parse the relational database format to determine affected downstream applications.

4. The system of claim 1, wherein applying one or more review criteria comprises the instructions causing the processor to:
   generate an interface to receive input altering a composition of the plurality of clusters, the interface comprising one or more flagged entries for review.

5. The system of claim 1, wherein the instructions cause the processor to:
   receive data indicating errors associated with outputs of the trained supervised machine learning model;
   retrain the trained supervised machine learning model based on the received data indicating errors; and
   process new metadata with the re-trained supervised machine learning model.

6. The system of claim 1, wherein the unsupervised machine learning process employs Kmodes.

7. The system of claim 1, wherein the instructions cause the processor to:
   automatically extract the new metadata input from a received data file from a data source to be ingested.

8. The system of claim 1, wherein the extracted metadata provided to the unsupervised machine learning process comprises at least one of a data source, an attribute identifier, an associated application, an expected data type, and a data value.

9. The system of claim 1, wherein the instructions cause the processor to:
   provide a validator that is automated, the validator relying on relationships captured by the plurality of curated clusters to validate different data sources in a same cluster of the plurality of curated clusters.

10. The system of claim 1, wherein to train the supervised machine learning model, the instructions cause the processor to:
    train the supervised machine learning model with one or more pre-defined industry standards.

11. A method for automating metadata processing, the method comprising:
    extracting metadata from a plurality of data sources;
    applying an unsupervised machine learning process to the extracted metadata to generate a plurality of clusters of the extracted metadata, the clusters defining attributes or parameters of metadata for the plurality of data sources as being related;
    applying one or more review criteria to the generated plurality of clusters to generate a curated plurality of clusters;
    training, with a supervised learning technique, a machine learning model with the curated plurality of clusters, the machine learning model being trained to predict a relevant cluster in response to input metadata;
    receiving a new metadata input;
    processing the new metadata input using the trained supervised machine learning model and output at least one predicted cluster for the new metadata input based on metadata attributes; and
    ingesting data associated with the new metadata input based on respective ones of the at least one predicted cluster output by the trained supervised machine learning model for categories of the new metadata input, wherein ingesting the data comprises converting at least one metadata attribute for at least a portion of the data associated with the new metadata input to be consistent with other data predicted as being from a same predicted cluster.

12. The method of claim 11, comprising extracting the curated plurality of clusters into a relational database format.

13. The method of claim 12, further comprising:
    receiving a data structure indicating that metadata of a data source present in the relational database format is being altered; and
    parsing the relational database format to determine affected downstream applications.

14. The method of claim 11, wherein applying one or more review criteria comprises generating an interface to receive input altering a composition of the plurality of clusters, the interface comprising one or more flagged entries for review.

15. The method of claim 14, further comprising:
receiving data indicating errors associated with outputs of the trained supervised machine learning model;
retraining the trained supervised machine learning model based on the received data indicating errors; and
processing new metadata with the re-trained supervised machine learning model.

16. The method of claim 11, wherein the unsupervised machine learning process employs Kmodes.

17. The method of claim 11, further comprising automatically extracting the new metadata input from a received data file from a data source to be ingested.

18. The method of claim 17, wherein the extracted metadata provided to the unsupervised machine learning process comprises at least one of a data source, an attribute identifier, an associated application, an expected data type, and a data value range.

19. The method of claim 11, further comprising:
providing a validator that is automated, the validator relying on relationships captured by the plurality of curated clusters to validate different data sources having categories grouped in a same cluster of the plurality of curated clusters.

20. A non-transitory computer readable medium for automating metadata processing, the computer readable medium comprising computer executable instructions for:
extracting metadata from a plurality of data sources;
applying an unsupervised machine learning process to the extracted metadata to generate a plurality of clusters of the extracted metadata, the clusters defining attributes or parameters of metadata for the plurality of data sources as being related;
applying one or more review criteria to the generated plurality of clusters to generate a curated plurality of clusters;
training, with a supervised learning technique, a machine learning model with the curated plurality of clusters, the machine learning model being trained to predict a relevant cluster in response to input metadata;
receiving a new metadata input;
processing the new metadata input using the trained supervised machine learning model and output at least one predicted cluster for the new metadata input based on metadata attributes; and
ingesting data associated with the new metadata input based on respective ones of the at least one predicted cluster output by the trained supervised machine learning model for categories of the new metadata input, wherein ingesting the data comprises converting at least one metadata attribute for at least a portion of the data associated with the new metadata input to be consistent with other data predicted as being from a same predicted cluster.

* * * * *